VOLTAGE CONTROLLED DIGITAL CIRCUITS

Filed July 28, 1966 Sheet 1 of 3

INVENTOR.
Peter S. Duryee
BY
Mueller, Aichele & Rauner
ATTY'S.

VOLTAGE CONTROLLED DIGITAL CIRCUITS

Filed July 28, 1966

INVENTOR
Peter S. Duryee
BY
Mueller, Aichele & Rauner
ATTY'S.

INVENTOR.
Peter S. Duryee
BY
Mueller, Aichele & Rauner
ATTY'S.

United States Patent Office 3,452,219
Patented June 24, 1969

3,452,219
VOLTAGE CONTROLLED DIGITAL CIRCUITS

Peter S. Duryee, Scottsdale, Ariz., assignor to Motorola Inc., Franklin Park, Ill., a corporation of Illinois Filed July 28, 1966, Ser. No. 568,463
Int. Cl. H03k *3/26*
U.S. Cl. 307—272 19 Claims This invention relates to controls for digital circuits which are responsive to amplitude-variable (analog) control signals, and particularly to a universal control circuit adapted to receive independent amplitude-variable signals for controlling the operation of a connected digital circuit, such as a flip-flop.

Practically every digital logical or switching system requires that the parameter of time be included in system operation. While time may be quantized for counting in digital circuits, the quanta are always generated by some device which is basically analog in character, such as a voltage or current threshold device. In many instances the number of active units within a system, which includes both digital and analog functions, may be substantially reduced by substituting certain analog functions for digital functions. By careful selection, system performance will not be degraded by such substitution.

Examples of analog units which may be incorporated into digital systems without degradation of system performance include voltage and temperature controlled oscillators, pulse duration and pulse position modulation systems, certain portions of servomechanism systems, phase-lock loops, pulse-rate memories, reset functions for resetting digital systems operated in an aperiodic repetitive operation, analog-to-digital and digital-to-analog conversion systems, analog instrumentation, etc. Many, if not all, of the above listed functions may be performed by combining a reactance circuit, such as a resistance-capacitance (RC) circuit, with a digital circuit to provide a timing function operated on amplitude thresholds.

One of the difficulties in implementing such analog functions in a digital system is the variation of the current or voltage amplitude threshold with variations in temperature. In a typical RC timing circuit, such as an astable (free-running) multivibrator, voltage-threshold drift may cause substantial frequency drift. It is, therefore, desired that such timing functions performed by an analog circuit connected to a digital circuit be made insensitive to temperature variations.

Another difficulty in using RC timing circuit is the recovery time of the circuits when unbalanced pulse periods are desired. For example, in the usual free-running transistorized multivibrator, the recovery time is approximately equal to four times the transistor-collector resistance divided by the resistance of the timing resistors in the RC circuit. This criteria limits the digital circuit in its ability to operate with unbalanced periods of current-conduction and non-conduction states. High-gain transistors have been used for permitting the timing resistances to be increased; this type of compensation is somewhat hazardous because of the marginal or inadequate base current at low temperatures. Another approach has been to reduce the supply voltage magnitude for decreasing the collector resistance. Such an approach is unsatisfactory because it decreases temperature stability and also requires increased power consumption.

Another problem is the linearity of response of the analog circuit. For greatest accuracy it is desired that there be a linear relationship between the amplitude variations of the control signal and the resulting effect on the digital system. In an RC circuit, changes in the time of charge or discharge of a capacitor, which usually provides the timing functions, should be linear with respect to changes in applied voltage. Linearity is obtained only by holding the capacitance charging current constant as the voltage of the control signal is varied. Such an operation provides a linear change in the period of the digital system with respect to a change in control voltage. This means that the time the digital system is in one electrical or logic indicating state may be varied linearly in this manner.

It is also desired to vary the frequency of operation of the digital system, i.e., the pulse repetitive frequency (prf.). The above described variation in period results in a non-linear change in pulse repetitive frequency. In order to obtain a linear change in prf. with a corresponding change in a control signal, the voltage swing through which the capacitance is charged and discharged (i.e., change in voltage from a minimum to a maximum, and reverse) is held constant and the capacitance charging current is held substantially constant over several cycles and varied in amplitude over a relatively long period of time. Therefore, there is required an effective constant current source which selectively provides different current magnitudes with a slow rate of change.

It is further desired to use integrated circuits in constructing digital switching systems. Such integrated circuits save space, weight and provide applications not possible with discrete components. Some integrated circuits use emitter coupled logic which in essence operates the semiconductor formed in the integrated circuits in a so-called current mode. A typical emitter coupled logic (ECL) voltage swing between two stable and logic indicating states is about 0.75 volt. In directly connecting analog timing elements to such a system, the voltage swing across the capacitance or inductance would be limited to said 0.75 volt. It is difficult to obtain linear responses in the capacitance or inductance and a good degree of accuracy over such a limited voltage range.

Accordingly, it is an object of this invention to provide a universal control circuit which is responsive to amplitude variable control signals to provide a linear change in digital circuit operation.

It is another object of this invention to provide a universal amplitude control circuit which selectively and linearly alters digital circuit operation as to its period and pulse repetitive frequency.

It is a further object of this invention to provide an amplitude-variable signal control which provides a linear variation in a digital circuit operating with extremely small voltage swings between two logic indicating states.

It is another object in conjunction with the preceding objects to provide temperature compensation in such control without redundant semiconductor devices.

It is a further object to provide various novel combinations of analog timing elements and digital circuits.

According to this invention and normal and complementary output signals of a digital circuit are differentially amplified to provide temperature compensation and increased voltage swing between two digital states. The differentially amplified signals may be applied to a diode-transistor logic (DTL) circuit. Such amplified output signals may also be electrically applied to RC timing elements with the output of the RC circuit being fed back to the digital circuit for affecting its operation, such as to pulse period or frequency.

The differentially amplified voltage is selectively limited or clamped for providing a variable voltage for charging RC timing elements. The variable voltage is supplied to the RC timing elements with an effective constant current to provide a linear change in the capacitance charging period and thereby a linear charging in the period of a connected digital circuit.

The connected digital circuit, for example, a flip-flop, has an input with a voltage threshold and is connected to the RC timing elements. The capacitance being charged varies the time at which the threshold is reached to alter the digital circuit time of switching.

With the conrollable constant current source and the vlotage limiing action described above, there may be provided independent controls for the digital circuit which are responsive to amplitude variable control signals which independently control (a) the period and (b) the pulse repetitive frequency of the circuit being controlled. This type of operation is especially useful when the digital circuit provides an asymmetrical output pulse pattern. For example, a monostable multivibrator may be in a first state for one period of time and in its second state for 300 units of time. This invention provides analog controls which will operate linearly over such a wide variation of digital system operation.

Referring now to the accompanying drawings.

In the universal control circuit a differential amplifier receives the normal and complementary output signals of a connected digital circuit. The two transistors forming the differential amplifier have their emitters commonly connected to a resistor. In this connection one transistor provides temperature compensation for the other. The collectors of the respective transistors are each connected to a load resistance. A first set of two amplitude variable control signal inputs, including semiconductor diodes or other unidirectional current conducting devices, are connected to the transistor collectors such that the voltage swing on a transistor collector is clamped by the variable voltage input. The voltage on the respective transistor collectors are connected to an emitter follower transistor, the emitter of which may be connected to an RC timing circuit, for example. A second voltage input is provided to the emitter of the output transistor through a common base connected transistor having its collector connected to the emitter of the output transistor. The collector impedance of such a transistor is extremely high to provide an effective constant current source. The collector current of the grounded base transistor is dependent only upon the base current and thereby only upon an input signal applied to the emitter electrode. It therefore acts as a constant current source which is controllable at the emitter electrode to selectively provide different magnitudes of constant current.

Figure 1:
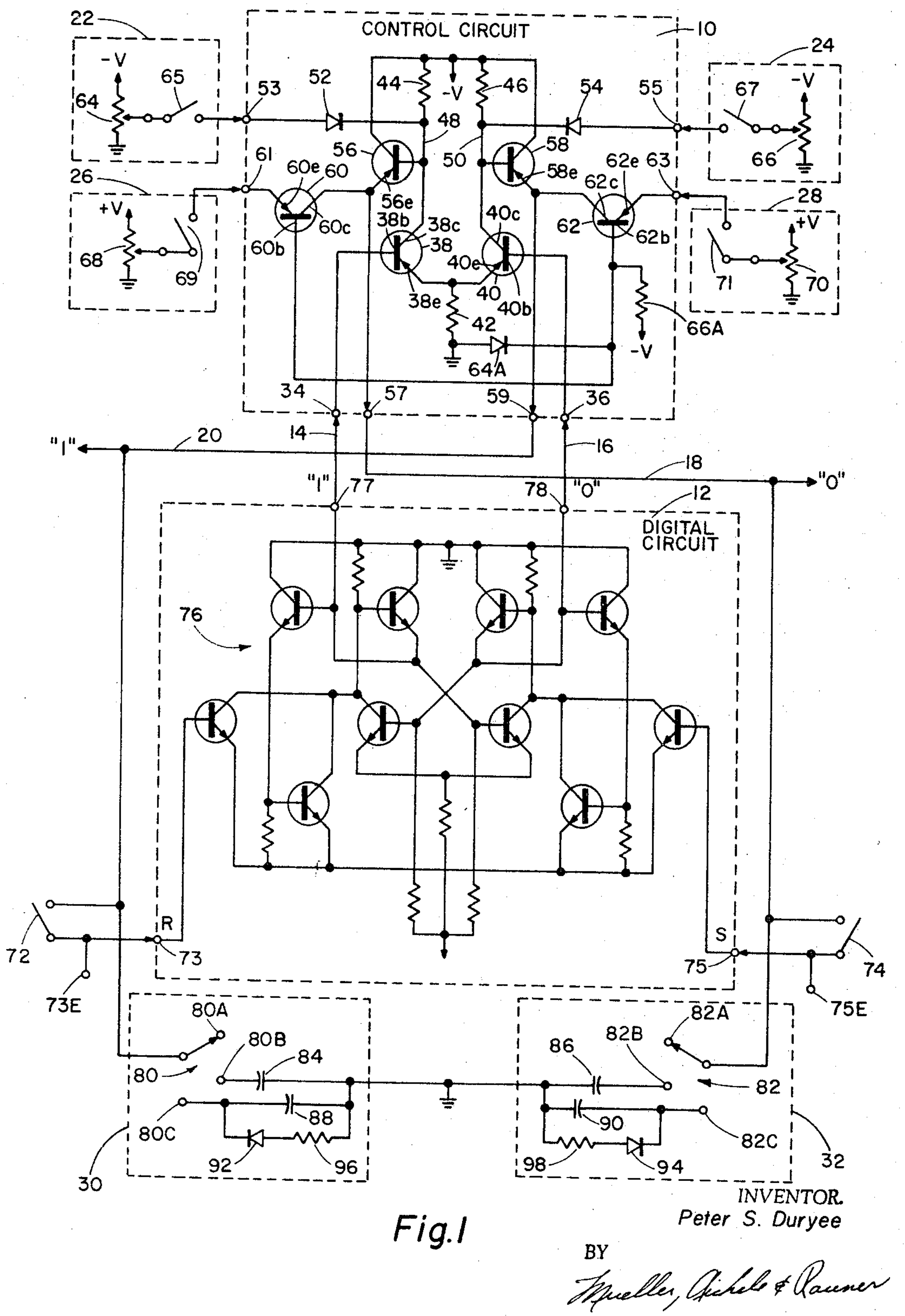
FIG. 1 is a schematic diagram showing an embodiment of the subject invention together with several connections to a digital circuit such that several functions are performed by the embodiment in novel arrangements.
Figure 4:
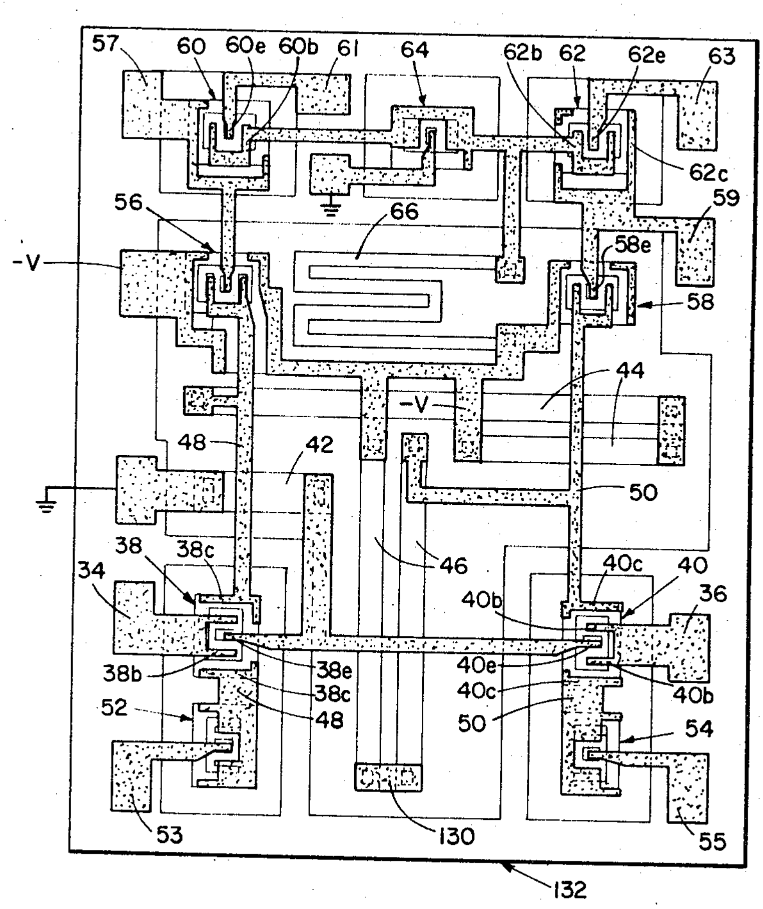
FIG. 4 is an exemplary composite drawing showing an integrated circuit layout for the described embodiment of a universal control circuit.

Referring now to FIG. 1, there is shown a schematic diagram of amplitude responsive universal control circuit 10. The illustrated circuit is also shown in FIG. 4 as a composite layout of an integrated circuit. With respect to item 10 in FIGS. 1 and 4, like numerals denote like parts and structural features of the illustrated control circuit.

Circuit 10 is shown connected to digtial circuit 12 which provides its normal output binary signal over line 14 and its complementary output binary signal over line 16. As illustrated, digital circuit 12 is an ECL flip-flop 76 having a voltage swing of 0.75 volt between binary 1 and binary 0 representation signals, no limitations thereto intended. For example, on line 14 a binary 1 is represented by a signal 0.75 volt more positive than that appearing simultaneously on line 16. When system 12 is in the binary 0 state, the line 16 voltage is 0.75 volt more positive than the line 14 voltage. Hereinafter, the terms "positive" and "negative" as applied to signal polarities refer to the above description, it being understood that the "positive" voltage, for example, may be —1 volt and the "negative" may be —1.75 volts, no limitation thereto intended.

*The control circuit*

Circuit 10 is responsive to signals on lines 14 and 16 to provide voltage amplified and polarity inverted signals respectively on lines 18 and 20. Circuit 10 output signals are selectively varied by signals in sources 22 and 24 which linearly and independently may vary the period of operation of circuit 12 as to the time it resides in the binary 1 and binary 0 indicating states. Additional variable amplitude sources 26 and 28 are connected to a voltage controllable constant current source providing current to output lines 18 and 20 for varying the pulse repetitive frequency of the digital circuit 12 pulses on lines 14 and 16. RC timing elements 30 and 32 are respectively and selectively connected to lines 20 and 18 for providing analog timing functions to circuit 12.

Circuit 10 input terminals 34 and 36 respectively receive the normal and complement pulses or digital signals from lines 14 and 16. Transistors 38 and 40, connected as a differential amplifier, respectively receive input digital signals from terminals 34 and 36 at their base electrodes **38*b* and 40*b*. The emitters 38*e* and 40*e* of the differential amplifier transistors are commonly connected by impedance 42 to ground reference potential. Such connection decreases the sensitivity of transistors 38 and 40 to temperature drift. Collectors 38*c* and 40*c* are respectively connected to load impedance resistors 44 and 46 which are in turn commonly connected to a —V potential source. Connections 48 and 50** on the respective collectors provide the input-output connections of the differential amplifier, as will now be described.

The first set of amplitude variable input sources 22 and 24 are connected through terminals 53 and 55 and clamp diodes 52 and 54 respectively to connections 48 and 50. The operation of both circuits will be described with respect to input source 22. As the voltage drop across resistor 44 decreases due to a decreased conductivity of transistor 38, the input voltage on terminal 53 acts through diode 52 to clamp or limit the negative excursion. Such clamping action limits the negative voltage swing to that voltage provided by source 22.

The digital signals on connections 48 and 50 are respectively sensed by common collector connected transistors 56 and 58. Such connected transistors are also referred to as emitter follower amplifiers. The emitters **56*e* and 58*e* of transistors 56 and 58 are respectively connected through output terminals 57 and 59 to lines 18 and 20. The digital signals are therefore inverted or complemented, that is, a relatively positive pulse or voltage on line 14 results by transistor 38 amplifying action to become relatively negative and in a like manner the line 16 voltage is inverted by amplifying action of transistor 40 before being applied to line 20**.

A second and additional set of amplitude variable input sources 26 and 28 are respectively connected to terminals 61 and 63 to emitter drive the common base connected transistors 60 and 62. These transistors effectively provide constant current sources. The collectors **60*c* and 62*c* of transistors 60 and 62 are respectively connected to the emitters 56*e* and 58*e*. The common base circuit of transistors 60 and 62 is formed by ground potential clamping diode 64A and bias resistor 66A connected to —V volts. Diode 64A prevents the base electrodes 60*b* and 62*b* of transistors 60 and 62** from going positive with respect to ground potential.

Input sources 22 and 24 are respectively shown as potentiometers 64 and 66 having their ends connected between —V volts and ground reference potential. The taps on the potentiometers are connected through switches 65 and 67 respectively to terminals 53 and 55. By closing switch 65 the voltage at the tap of potentiometer 64 is selectively applied through diode 52 to clamp the voltage swing on connection 48. Source 24 operates identically with respect to connection 50. Potentiometers 64 and 66 are schematically shown for illustrating one way of providing a variable control voltage, no limitation thereto being intended.

Second or additional sources 26 and 28 are also shown as consisting of potentiometers 68 and 70 respectively connected between +V volts and ground reference potential. Potentiometer taps are connected respectively through switches 69 and 71 to terminals 61 and 63 of circuit 10 for providing a variable voltage drive to the emitters 60_e_ and 62_e_ of transistors 60 and 62 for controlling the effective constant current magnitudes.

In FIG. 1 there are shown a plurality of switches providing a variety of connections between control circuit 10 and digital circuit 12. It is to be understood that in embodying this invention such switches would probably not be used, the switches being illustrated only to simplify the presentation of this invention and to illustrate the versatility of control circuit 10 when connected to a digital circuit. With all of the switches being in the position illustrated, i.e., making no connections, control circuit 10 operates as a symmetrical amplifier for the output of digital circuit 12 for increasing the voltage swing between the binary voltage states such that the signals on output lines 18 and 20 may be provided to a diode-transistor logic circuit, for example, which requires greater voltage swing than the illustrated ECL circuit 12.

The electrical state of the FIG. 1 illustrated circuits when digital circuit 12 is in its so-called binary 1 state is now described. A relatively positive voltage is supplied by flip-flop 76 over line 14 to bias transistor 38 to current cutoff (non-conduction). Correspondingly, flip-flop 76 supplies a relatively negative voltage over line 16 for biasing transistor 40 to current conduction, preferably maximum conduction (current saturation). Since transistor 38 is non-conductive, —V volts appear on connection 48. With transistor 40 at maximum current conduction a large voltage drop appears across resistor 46 making the connection 50 voltage relatively positive. The connection 48 negative (—V) voltage biases emitter follower transistor 56 to current conduction to provide a low impedance path between the —V supply and output terminal 57 making it negative. In the other sense, connection 50 is relatively positive to bias emitter follower transistor 58 to current cutoff. This action effectively isolates output terminal 58 from —V volts by providing an extremely high impedance. Because of connections outside circuit 10, the line 20 (terminal 59) voltage is made positive.

The electrical state of circuits 10 and 12 when the flip-flop 76 is in the binary 0 indicating state are reversed from that just described. In such instance, emitter follower transistor 56 is at current cutoff to block —V volts from line 18 permitting such line to have a positive voltage on it, and transistor 58 is at its maximum current conduction state for passing —V volts to line 20.

*A voltage controlled monostable multivibrator*

A monostable multivibrator is formed with circuits 10 and 12 by closing switch 72 at input 73 of circuit 12, keeping switch 74 open and utilizing terminal 75E as an initiating pulse input for setting flip-flop 76 to place the monostable circuit in a time limited stable state as will become apparent. Switch 80 is set to terminal 80B for connecting RC timing circuit 30 including capacitor 84 to line 20. The RC circuit time constant is provided by capacitor 84 in combination with the resistance of potentiometer 70 as connected through closed switch 71, and grounded base transistor 62 to line 20. When transistor 58 is conducting current, all of the constant current provided by transistor 62 is shunted from capacitor 84 through the transistor 58 to —V voltage supply, and capacitor 84 is rapidly charged to and held at negative —V volts. When transistor 58 is not conductive, the effective constant current source including transistor 62 discharges the negative charge on capacitor 84 for resetting flip-flop 76. As the capacitor 84 voltage becomes more positive, the transistors of flip-flop 76 connected to terminal 73 are biased to current conduction which initiates switching action in a well-known manner. After switching line 14 is negative and line 16 positive, the time limited state being indicated by line 14 being positive.

The duration of the time limited state may be linearly varied after closing switch 67. The voltage swing on connection 48 is then controlled by source 24 acting through clamp diode 54. The period of flip-flop 76 maintaining the set or time limited stable state may be linearly varied by adjusting the setting on potentiometer 64 of input source 24. This action alters the voltage to which capacitor 84 is negatively charged. It also provides a linear change in discharging time of capacitor 84 because of the effective constant current provided through base connected transistor 62.

A monostable multivibrator operating oppositely to that just described, i.e., the time limited state in the reset rather than the set state, may be formed by closing switches 74, 69 and 65. Switch 82 is set to terminal 82_b_ for connecting capacitor 86 of timing circuit 32 to line 18. Switch 72 at input 73 is open so that terminal 73_e_ receives the initiating impulse for resetting flip-flop 76. In this latter connection the normal or quiescent stable state of flip-flop 76 is the set state with a positive voltage over line 14 while the time limited stable state is indicated by a positive voltage on the line 16.

*A fixed frequency astable multivibrator*

A fixed period, fixed frequency, free-running multivibrator is formed by setting switches 80 and 82 respectively to terminals 80_c_ and 82_c_ to connect timing capacitors 88 and 90, timing resistors 96 and 98, and diodes 92 and 94 to lines 20 and 18. Switches 72 and 74 are closed. When flip-flop 76 is supplying a positive potential over line 14, circuit 10 supplies a negative potential over line 18 for rapidly negatively charging capacitor 90 through transistor 56. This action prepares timing circuit 32 for the next period of the multivibrator action. One period control for flip-flop 76 is provided by capacitor 88 of circuit 30 slowly discharging from a negative voltage charge through timing resistor 96 and diode 92. After flip-flop 76 is reset by circuit 30, it supplies a positive voltage over line 16. Emitter follower 58 is conductive for rapidly negatively charging capacitor 88. Timing circuit 32 capacitor 90 discharges through resistor 98 to set flip-flop 76 after a predetermined time forming another period of the multivibrator action. The cycle then is repeated. It is to be understood that the time provided by capacitors 88 and 90 may be different to provide asymmetrical output pulses on lines 14 and 16.

*A fixed time period monostable multivibrator*

A fixed time period monostable multivibrator is provided by setting either of switches 80 or 82 their respective terminals 80_c_ and 82_c_ and then respectively opening one of switches 72 and 74 and closing the other. For example, if switch 80 is set to terminal 80_a_ and switch 82 to terminal 82_c_, then switch 72 is opened and 74 is closed. An initiating impulse for resetting flip-flop 76 for placing the monostable multivibrator in its time limited state is applied to terminal 73_e_. The time flip-flop 76 is in the reset state is determined by the time constant of capacitor 90 and resistor 98.

*A voltage controlled oscillator*

Another form of the time base is a voltage controlled oscillator (VCO) as may be provided by the following described connections. Switches 80 and 82 are respectively set to terminals 80_b_ and 82_b_ for connecting capacitors 84 and 86 to lines 20 and 18 to form a part of the frequency determining portion of a VCO. Switches 72 and 74 are closed for providing feedback from circuit 10 to circuit 12. Switches 69 and 70 are closed for connecting input sources 26 and 28 to constant current source transistors 60 and 62 of circuit 10. For a symmetrical output from the VCO potentiometers 68 and 70 are set to supply identical voltages to terminals 61 and 63. Alternatively sources 26 and 28 may be combined to supply a single voltage to both switches 69 and 71. With the latter mentioned common control voltage, the frequency of the oscillator may be varied while maintaining symmetry of the output waveform.

The frequency control voltage is applied through the constant current transistors 60 and 62, to provide a linear variation of oscillation frequency with a change in control voltage amplitude. The voltage swings across timing capacitors 84 and 86 are held constant by action of the transistors 56 and 58. As the control voltages from potentiometers 68 and 70 are simultaneously increased, the effective constant currents provided to capacitors 84 and 86 are correspondingly increased which linearly increases the oscillation frequency of the combined circuits 10 and 12.

*A voltage controlled periodic pulse generator*

A periodic pulse generator with linear voltage control of pulse width is provided with the below described connections. In this arrangement the frequency of operation will not provide as linear a response to the change in voltage as was provided by the above described voltage controlled oscillator. The voltage control for the pulse repetitive frequency i.e., sources 26 and 28 actually affects the spaces between the formed pulses as will become apparent. A pulse is defined as a relatively positive voltage on line 14 and the space between two pulses is the length of time a relatively negative voltage is supplied to line 14. Perfect linearity of frequency change will be achieved only if the pulse width is zero (a trivial case). Therefore, it is desired that the pulse width be kept as short as possible in using the below described circuit. The ratio of pulse width or duration to spacing between successive pulses of 1 to 550 has been achieved using the below described circuits.

To form this arrangement, switches 72 and 74 on the inputs of circuit 12 are closed. Switches 80 and 82 are set to connect terminals 80*b* and 82*b* connecting capacitors 84 and 86 to lines 20 and 18 respectively. The corresponding timing resistors are provided by sources 26 and 28 as connected by closing switches 69 and 71. In this arrangement, potentiometer 70 is set to +V volts to provide in combination with capacitor 84 a constant frequency reference potential while source 26 provides a voltage control for varying the pulse repetitive frequency by varying the spacing between successive pulses. Source 22 is connected through terminal 53 by closing switch 65 to provide a linear pulse width control.

As a "positive" pulse is provided on line 14, transistor 38 is driven to non-conduction. This quickly makes connection 48 voltage negative as determined by input means 22 clamping the connection 48 voltage by diode 52. This action determines the voltage to which capacitor 86 will negatively charge and thereby determines the pulse width (discharge time of capacitor 86).

Source 28 selectively varies the frequency of operation by varying the spacing between successive pulses. Input 28 provides a controllable constant current through common base transistor 62 to selectively alter the discharge rate of capacitor 84 and therefore the time constant of capacitor 84 and potentiometer 70. Altering the discharge rate of capacitor 84 varies the frequency of operation of circuits 10 and 12 by changing the spacing between successive pulses. It is seen therefore that the pulse width variation is controlled independent of the spacing between pulses for providing a flexible periodic pulse generator.

*Period and frequency controlled pulse generator*

Figure 2:
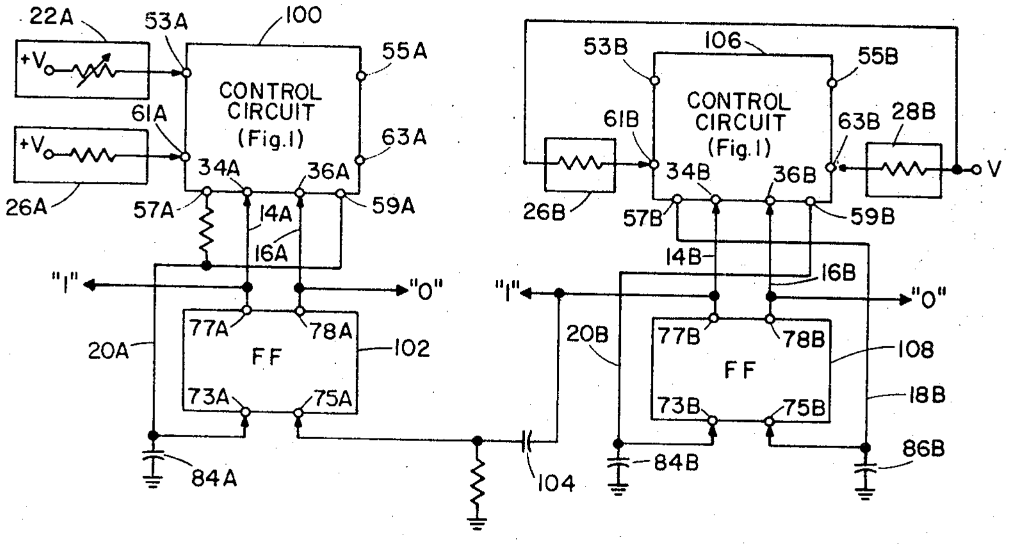
FIG. 2 is a block diagram showing an additional arrangement of the FIG. 1 embodiment operating as a periodic pulse generation.

Referring now more particularly to FIG. 2, there are shown two control circuits 100 and 106 constructed identically with the FIG. 1 illustrated circuit 10. Corresponding terminals on these two circuits are indicated by the same numerals as used in circuit 10 but respectively with the suffixes A and B. Flip-flops 102 and 108 correspond to digital circuit 12 with corresponding input and output terminals being indicated by the same numerals also with the respective suffixes A and B.

The FIG. 2 illustrated circuits and connections provide a periodic pulse generator having an independent linear control for altering pulse width and another independent control for altering pulse repetition frequency. The ratio of pulse width to the period between successive pulses may be as small as one part in twenty million.

Control circuit 100 and flip-flop 102 cooperate to provide a linear voltage controlled monostable multivibrator respectively actuated by a linear voltage controlled oscillator (VCO) formed by control circuit 106 connected as shown to flip-flop 108. Circuits 100 and 102 interconnected as shown, are identical with the connections described with respect to FIG. 1 for a voltage controlled monostable multivibrator. The frequency of oscillation of VCO 106, 108 is controlled by voltage V applied through the set of input sources 26B and 28B and thence terminals 61B and 63B of control circuit 106. Period control input terminals 53B and 55B are unconnected. Flip-flop 108 has its output terminals 77B and 78B connected over lines 14B and 16B to circuit 106 input terminals 34B and 36B. The oscillation frequency is determined by the time constant provided by sources 26B and 28B impedances as connected to capacitors 84B and 86B, respectively, over lines 20B and 18B. VCO 106, 108 operates as aforedescribed for the FIG. 1 described voltage controlled oscillator.

The output voltage of VCO flip-flop 108 is taken over line 14B and AC coupled by capacitor 104 to flip-flop 102 input terminal 75A. The repetitive signals from VCO 106, 108 applied to terminal 75A repetitively initiates monostable multivibrators 100, 102, as described for the one-shot or monostable multivibrator described with respect to FIG. 1 input terminal 75E.

It is noted herein that the frequency of operation of VCO 106, 108 is independent of the pulse width selected by monostable multivibrator 100, 102. Correspondingly, the pulse width determined by the voltage source 22A as applied to circuit 100 is unrelated to the frequency of operation of the linear voltage controlled oscillator. In this manner the pulse width to the pulse space ratio was made as large as one to twenty million.

*Rechargeable monostable multivibrator*

Figure 3:
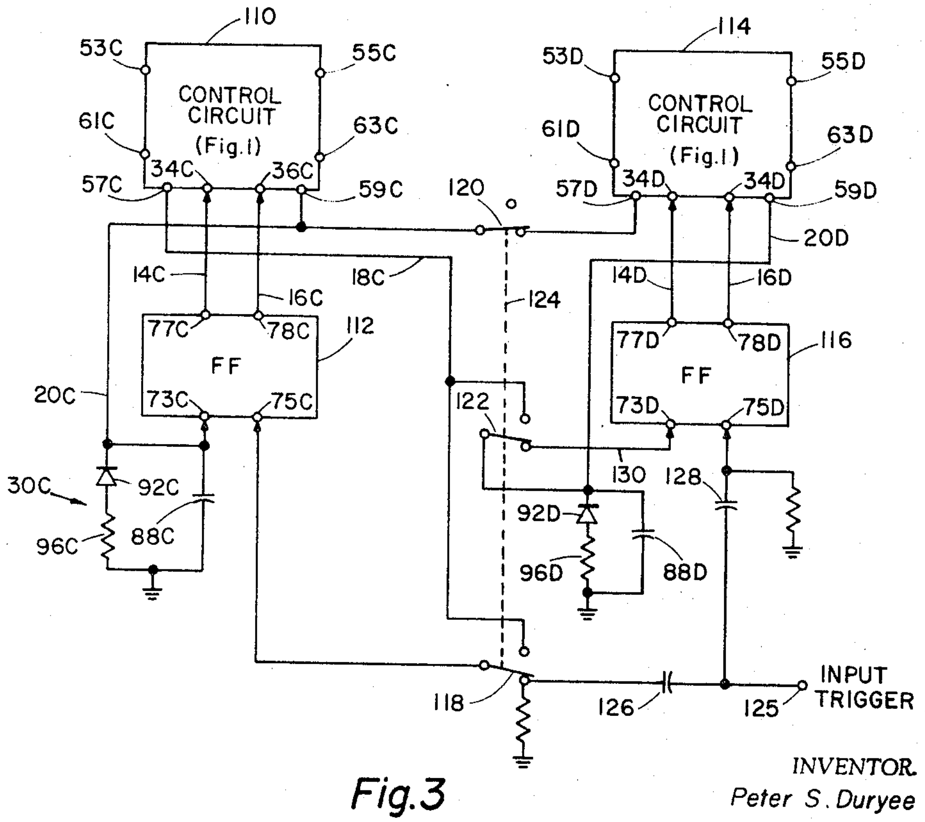
FIG. 3 is a combined block and schematic diagram showing additional novel circuits and functional arrangements using the FIG. 1 embodiment.

Referring now to FIG. 3 and with the illustrated switches set as shown, there is illustrated a rechargeable monostable multivibrator. Normally a monostable multivibrator receiving a triggering or initiating pulse while it is in its time limited stable or triggered state will not be affected by the receipt of such pulse. In the below described monostable multivibrator the receipt of initiating pulse during the time limited stable state will extend the duration of such time limited stable state. Assume for purposes of discussion that the initiating pulse setting the monostable circuit to its time limited state was received midway between the triggering on and the automatic resetting of the monostable multivibrator. The total time the monostable multivibrator will remain in its time limited state will be one and one-half times its normal duration.

The rechargeable monostable multivibration includes a primary and a secondary monostable multivibrator. The primary multivibrator includes control circuit 110 connected as shown to flip-flop 112. The secondary monostable multivibrator includes control circuit 114 and flip-flop 116 interconnected as shown. Both multivibrators operate as previously described for the FIG. 1 illustrated fixed period monostable multivibrator excepting as hereinafter pointed out.

The duration of the secondary monostable multivibrator time limited state is made short with respect to the primary multivibrator time limited state, for example, one unit of time as compared with three hundred units for the primary period. The selection of the ratio can provide a variety of operations as will become apparent.

Initially both flip-flops 112 and 116 are in the reset state; the primary timing capacitor 88C and secondary timing capacitor 88D are at maximum negative charge. The two multivibrators are interconnected in that primary timing capacitor 88C is connected over line 20C, through closed switch 120 to terminal 57D of circuit 114 as well as the usual monostable connection to circuit 110 terminal 59C. This interconnection keeps capacitor 88C clamped at maximum negative charge whenever secondary multivibrator 114, 116 is in its time limited or set state. This action serves to delay discharge of timing capacitor 88C negative voltage until after secondary multivibrator flip-flop 116 has returned to its reset state. Therefore, only in the short period of time after both flip-flops 112 and 116 are set will an input pulse be ignored. For example, the time limited state of the secondary multivibrator may be 1/300 of the primary multivibrator time limited stable state.

The operation of the monostable circuits will now be described. An input trigger pulse is applied to terminal 125 which is AC coupled by capacitor 126 to set flip-flop 112 and throught capacitor 128 to set flip-flop 116. Control circuit 114 responds to the positive voltage supplied to terminal 77D from flip-flop 116 by providing a high impedance to terminal 59D such that capacitor 88D begins to discharge through timing resistor 96D and diode 92D. A low impedance circuit having a negative voltage thereon is at terminal 57D keeping primary timing capacitor 88C from discharging. Current continues to flow from ground reference potential through timing resistor 96C and diode 92C thence over line 20C and switch 120 through terminal 57D into circuit 114.

Flip-flop 116 is quickly reset by capacitor 88D discharging. At this time the circuit 114 provides a high impedance circuit to terminal 57D permitting primary timing capacitor 88C voltage to discharge through timing resistor 96C. Simultaneously, a low impedance circuit is provided through terminal 59D over line 20D for rapidly negatively charging capacitor 88D. Flip-flop 116 is now responsive to any subsequent input trigger pulse.

Assume that primary timing capacitor 88C has partially discharged. Flip-flop 112 is still in its set state providing the defined output pulse on line 14C. A second input trigger pulse is applied to terminal 125 having no effect on flip-flop 112 since it is still in its set state. However, flip-flop 116 has been reset and therefore it is set by the second input trigger pulse. Immediately circuit 114 provides a low impedance rapidly negatively charge path to terminal 57B and primary timing capacitor 88C rapidly charges to its initial charge state. Circuit 114 again clamps primary timing capacitor 88C voltage to the initial maximum negative charge. Upon the automatic resetting of flip-flop 116, circuit 114 provides a high impedance to terminal 59D permitting capacitor 88C to again discharge its negative charge through resistor 96C. This action provides a full length time limited stable state of primary multivibrators 110, 112 added to the pulse (not shown) on line 14C. Such action can be repeated again and again. By permitting primary timing capacitor 88C to discharge, flip-flop 112 is reset, returning the entire circuit to its initial state.

The described circuit is responsive to successive input pulses having a pulse spacing longer than the time limited stable state of secondary monostable multivibrator 114, 116. In this manner the described circuit can be used as a rate monitor. That is, as long as input triggers occur within the primary timing period the circuit will always remain in the set state providing a positive pulse output on line 14C indicating such input trigger pulses are being received on terminal 125.

*Gated astable multivibrator*

Continuing with FIG. 3, a so-called gated free-running multivibrator is formed by resetting switches 118, 122 and opening switch 120. With the revised connections flip-flop 112 cooperates with circuit 110 and the timing circuits including capacitors 88C and 88D to provide an astable multivibrator. Circuit 114 in combination with flip-flop 116 provide a gate which when closed, i.e., provides negative voltage through a low impedance over line 20D to astable multivibrator connected circuit 112–110, holding the astable multivibrator in a predetermined state. The astable circuit will not again begin oscillations until exactly one-half cycle after the gate 114, 116 has been opneed. An application of this arrangement includes providing timing pulses to a digital system from flip-flop 112. When it is desired to stop operation of such a system, one merely opens gate 114, 116 stopping the oscillations. In certain situations a substantial number of digital pulse circuits can be eliminated when the output of the timing or clock oscillator is gated.

The circuits 110 and 112 are interconnected to form the astable multivibrator 110, 112 by connecting circuit 110 output terminal 57C over line 18C and switch 122 to timing circuit including capacitor 88D and through switch 118 to input terminal 75C of flip-flop 112. Further output terminal 59C of circuit 110 is connected over line 20C to timing circuit 30C and to input terminal 73C. Switch 120 in line 20D is opened. Dotted line 124 indicates an operative connection between all of the just described switches such that all switches are simultaneously actuated. Circuit 114 has its output terminal 59D connected over line 20D to a timing circuit including capacitor 88D. Therefore capacitor 88D is connected to circuit 114, terminal 59D, circuit 110, terminal 57C, and flip-flop 112 input terminal 75C. Gating action is provided over this last described connection.

The astable multivibrator operates as described with respect to FIG. 1 illustrated fixed period astable multivibratoras long as flip-flop 116 is set. When set, flip-flop 116 provides a relatively positive voltage over line 14D actuating circuit 114 to provide a high impedance to terminal 59D. As such timing circuit including 88D is selectively operative to discharge under control of circuit 110 for providing astable multivibrator operation in combination with the other circuits including flip-flop 112 and control circuit 110.

The astable action is stopped by applying a pulse to line 130 for resetting flip-flop 116. Quickly circuit 114 provides a negative voltage to terminal 59D which quickly negatively charges capacitor 88D and holds capacitor 88D voltage at its maximum negative value. Since capacitor 88D cannot discharge; flip-flop 112 is held in its reset state with capacitor 88C discharged.

Oscillations are restarted by applying a pulse to terminal 125 for setting flip-flop 116. High impedance is restored to circuit 114 terminal 59D permitting capacitor 88D to discharge under control of circuit 110 one-half cycle after receipt of the trigger pulse on terminal 125 (time of discharge of capacitor 88D). This particular system is a convenient way of resynchronizing the operation of the astable multivibrator including circuit 110 by external control signals.

Referring now to FIG. 4, circuit 10 of FIG. 1 is shown in integrated circuit form wherein the numerals indicate like parts. The dotted portions 130 represent conductors respectively interconnecting electrical components formed on the silicon wafer 132. The various lines indicate the boundaries of integrated components. For example, in transistor 62 the base portion **62*b* is shown as being a small rectangle containing a small rectangle 62*e*, the emitter portion. The collector is shown as a large rectangle 62*c* containing the base rectangle 62*b*. Resistor 66** is shown as a serpentine path. In numerals 1 through 10 in the rectangular conductor portions respectively indicate the contact number for the silicon chip. Integration of the circuit may be accomplished in the usual manner. The wafer is preferably 30 mils by 50 mils.

What is claimed is:

1. A universal circuit module adapted to use as variable amplitude control signal responsive digital circuit controller, including in combination, differential amplifier means having a pair of semiconductor devices, each device having a pair of main electrodes and a control electrode, a common impedance connected to one of the main electrodes of each device, first and second connections being respectively connected to another one of said main electrodes of each of said devices, first and second load impedances being respectively connected to said first and second connections, and further having separate input means connected to each control electrode and which are adapted to be connected respectively to complementary output portions of a first digital circuit, a pair of first control signal input means adapted to receive variable amplitude control signals and each including a unidirectional current conducting device connected to each of the first and second connections for selectively clamping the connections to received control signal amplitudes, output means having first and second output terminals and being connected to said connections and having a pair of emitter follower semiconductor amplifiers with the emitter electrode thereof being respectively connected to the output terminals such that the signals on said first and second connections are respectively translated to the first and second output terminals, and a pair of second control signal input means adapted to receive variable amplitude control signals and each having a semiconductive common base amplifier, the amplifiers each having a collector portion respectively connected to said first and second output terminals and each having an emitter portion adapted to receive a variable amplitude control signal for providing a controllable constant amplitude current to said respective output terminals.

2. The combination of claim 1 wherein one of said input means have first and second input terminals for independently receiving a pair of amplitude variable control signals and being arranged such that the respective received independent control signals are respectively operative with circuits connected respectively to said first and second output terminals.

3. The combination of claim 2 wherein the first input means receives said separate and independent control signals and further the second input means receives but one control signal.

4. The combination of claim 1 further including, a digital circuit having first and second output terminals each of which provides binary indicating signals and having corresponding first and second input terminals for receiving signals to selectively alter the digital state of the circuit, said separate inputs of the differential amplifier means being respectively connected to said first and second digital circuit output terminals for receiving the binary signals, and reactance timing circuit means connected to said output means first output terminal for receiving the digital circuit provided first output terminal binary signal as modified by said first and second control signal input means to provide an analog time base signal.

5. The combination of claim 4 wherein said digital circuit is operated in a current mode having relatively small voltage swings and said differential amplifier means is in integrated circuit form.

6. An astable multivibrator system including the combination of claim 4 and whereins the reactance timing circuit means is a resistance-capacitance timing circuit and is connected to the first input terminal of said digital circuit, a second timing circuit means having a resistance-capacitance timing element connected to the output means second output terminal and to the digital circuit second input terminal, such that the binary signal from the digital circuit first and second output terminals are respectively supplied to the digital circuit first and second input terminals for respectively changing the digital state of said digital circuit whereby the binary signals on said first and second digital output terminals change their binary state in response to said timing circuit means.

7. The combination of claim 6 wherein one of said variable control input means receives a variable input control signal for selectively altering the operation of the astable multivibrator system.

8. The combination of claim 7 wherein said one input means is the first input means having a separate and independent control voltage signal respectvely controlling and limiting the voltage signal variations on the respective differential amplifier means connections, and common variable voltage means connected to said second input means for providing selective control of the frequency of operation of said multivibrator system.

9. A gated astable multivibrator including the combination of claim 6 and further including second differential amplifier means having a pair of semiconductor devices each of which has a pair of main electrodes and a control electrode, a common impedance connected to one of the main electrodes of each device, third and fourth connections each with a load impedance and respectively connected to another of said main electrodes of each device of said second amplifier means, the amplifier means further having separate input means for each of its said devices and which are adapted to be connected respectively to complementary output portions of a second digital circuit, a third common collector connected transistor amplifier having a control electrode and an output electrode, the common collector amplifier control electrode being connected to said fourth connection and the output electrode being connected to the first digital circuit first input terminal, said second differential amplifier means being responsive to receive signals on said second means separate inputs for selectively varying the conductivity of said common collector amplifier whereby the multivibrating system including said first digital circuit is selectively turned on and off by switching the common collector amplifier between conductance and non-conductance.

10. The combination of claim 4 wherein one of said variable amplitude input means is connected to a variable amplitude signal source for altering the operation of said reactance time circuit means.

11. A monostable multivibrator system including the combination of claim 10 and wherein said one variable amplitude signal input means is said first input means for varying the period of charging of said reactance timing circuit means, and a second variable amplitude voltage source connected to the said second input means for controlling a constant amplitude current charging current for said reactance timing circuit means and wherein said first output terminal is connected to the first input terminal of the first digital circuit for forming a variable frequency variable period monostable multivibrating system.

12. A monostable multivibrator system including the combination of claim 4 and wherein said output means first output terminal is connected to the first digital circuit first input terminal and wherein the reactance timing circuit means includes a resistance-capitance timing circuit.

13. A periodic pulse generator including the combination of claim 12 and further including voltage controlled oscillation means connected to said first digital circuit, second input means for repetitively setting the said first digital circuit for providing recurrent pulses therefrom, and said oscillating means including another digital circuit having third and fourth output terminals respectively providing normal and complementary output binary signals and having a pair of input terminals for selectively altering the state of said another circuit, another differential amplifier means having a pair of output connections and a corresponding pair of input connections, said input connections being respectively connected to said another digital circuit third and fourth output terminals, another reactance timing circuit means respectively connecting said another differential output connections to said another digital circuit third and fourth input terminals for providing analog timed voltage feedback from the another digital circuit outputs to its inputs for sustaining periodic voltage changes, and said another timing means including a constant current source having a variable voltage means for selectively altering the amplitude of applied constant current for selectively altering the frequency of said oscillation means.

14. A rechargeable monostable multivibrator system including the combination of claim 12 and further including an additional digital circuit having third and fourth output terminals and third and fourth input terminals for receiving signals to selectively change the state of said additional circuit, trigger pulse input means connected to the additional circuit third input terminal and to the first digital circuit first input terminal for simultaneously setting said circuits to a first electrical state, additional differential amplifier means having a pair of semiconductor devices each of which has a pair of main electrodes and a control electrode, a common electrode, a common impedance connected to one of said main electrodes of each of said additional means semiconductor devices, and third and fourth output connections respectively connected to another one of said additional means devices main electrodes, and separate input means in the additional differential amplifier means respectively connected to the last mentioned control electrodes, said additional circuit third and fourth output terminals being respectively connected to said separate inputs of the additional differential amplifiefir means, RC timing means connected to said first output connection and to said additional digital circuit third input connection such that when the additional digital circuit receives an input trigger pulse the digital circuit is reset after a short predetermined time, said second output connection of said second differential amplifier means being connected to said first input connection of the first mentioned digital circuit for preventing said first differential amplifier means from actuating the first mentioned reactance timing circuit means until after said second differential amplifier means has returned to its initial state.

15. A rechargeable monostable multivibrating system, including in combination, first and second monostable multivibrator means each having a monostable state and a time limited stable state and a set input for receiving signals which selectively switch the respective multivibrator means to its said time limited stable state, and each further having a capacitance circuit exhibiting a voltage which moves between first and second voltage states, and being operative during the respective time limited stable states for altering the voltage state on the capacitance circuit from a first to a second voltage state, and the multivibrator means being respectively responsive to its said capacitance circuit reaching said second voltage state to automatically reset to its respective monostable state, said first multivibrator means having a time limited stable state of shorter duration than the time limited stable state of said second multivibrator means, voltage clamp means connected to said first multivibrator means and to said second multivibrator means capacitance circuit, and being responsive to said first multivibrator means being in its time limited stable state to voltage clamp the second multivibrator capacitance circuit to said first voltage state, and input means connected to both said inputs of said multivibrator means such that any received pulse on said input means is operative to actuate said monostable multivibrator means to their respective time limited stable states at any time except when both of said multivibrator means are in their respective time limited stable states.

16. A monostable multivibrator, including in combination, a bistable circuit having first and second output terminals and set and reset inputs, semiconductor amplifier means including a load impedance and a semiconductor device connected to the impedance for forming an output connection and having an input terminal connected to a first output terminal of said bistable circuit for receiving binary signals therefrom, which alternately switch the amplifier between conduction and non-conduction states, first control input means adapted to receive amplitude variable control signals and including a unidirectional current conducting device connected to said connection for selectively limiting the digital signal magnitudes in one polarity in response to a received amplitude variable control signal, emitter-follower amplifier means having an input electrode connected to said connection and having an emitter output circuit and being for translating the signals on said connection to said output circuit, voltage controllable constant current means connected to said emitter output circuit for providing voltage controlled constant current thereto, a resistance-capacitance timing circuit connected to said emitter output circuit for receiving output current therefrom for being selectively charged or discharged, and being connected to the reset input terminal for resetting the bistable circuit, and means for setting said bistable circuit.

17. The combination of claim 16 and further including a monostable multivibrator capable of exhibiting a time limited stable state and having a set input connected to said bistable circuit set input and having output voltage clamp means connected to said resistance-capacitance timing circuit for selectively clamping said timing circuit to a predetermined voltage whenever said monostable multivibrator is in its time limited stable state.

18. The combination of claim 16 wherein said bistable circuit selectively switches between two voltages indicating states which are less than one volt apart.

19. A control circuit responsive to digital and analog signals, including in combination, first and second potential source means, first and second transistors having a base and a pair of main electrode portions.

a resistor connected to one of said main electrodes of each transistor and to the first potential means, first and second load resistors connected to the second potential means and respectively to another of said main electrode portions of said transistors, a pair of unidirectional current conducting means respectively connected to said another main electrode portions and adapted to receive analog control signals, third and fourth transistors each having base and main electrode portions with the respective base portions connected to said another main electrode portions of said first and second transistors, and one of said main electrodes of each said third and fourth transistors connected to said second potential means.

fifth and sixth transistors each having base and main electrode portions with their respective base portions connected together and one of their respective main electrodes connected to another main electrode of the said respective third and fourth transistors, a resistor connected between said second potential means and said connected together base electrode portions, the base electrode portions being adapted to simultaneously respectively receive complementary digital signals, and another of said main electrodes of the fifth and sixth transistors being adapted to receive analog signals.

References Cited

UNITED STATES PATENTS

| | | | |
|---|---|---|---|
| 2,863,052 | 12/1958 | Fraser | 328—63 |
| 3,403,266 | 9/1968 | Heuner et al. | 307—247 |
| 3,403,268 | 9/1968 | Becker et al. | 307—246 |

ARTHUR GAUSS, *Primary Examiner.*

B. P. DAVIS, *Assistant Examiner.*

U.S. Cl. X.R.

307—273, 291, 293; 330—30; 331—113